United States Patent [19]

Tung

[11] Patent Number: 5,356,583
[45] Date of Patent: Oct. 18, 1994

[54] METHOD OF MAKING A MODIFIED BURN CHARACTERISTIC SARANEX FILM

[75] Inventor: Harvey C. Tung, Newark, Ohio

[73] Assignee: The Dow Chemical Company, Midland, Mich.

[21] Appl. No.: 89,009

[22] Filed: Jul. 9, 1993

Related U.S. Application Data

[62] Division of Ser. No. 801,995, Dec. 3, 1991, Pat. No. 5,250,350.

[51] Int. Cl.$^5$ .............................................. B29C 47/06
[52] U.S. Cl. .................................... 264/171; 264/211; 264/211.23; 425/133.5
[58] Field of Search .................... 264/171, 211, 210.6, 264/211.23, 331.17; 425/131.1, 132, 133.5; 428/216, 920, 921

[56] References Cited

U.S. PATENT DOCUMENTS

| | | | |
|---|---|---|---|
| 3,821,182 | 6/1974 | Baird, Jr. et al. | 264/171 |
| 4,104,404 | 8/1978 | Bieler et al. | 428/516 |
| 4,402,889 | 9/1983 | Bonis | 425/133.5 |
| 4,592,941 | 6/1986 | Emmons . | |
| 4,828,928 | 5/1989 | Shah | 428/516 |
| 4,975,316 | 12/1990 | Romanowski | 428/920 |
| 5,037,683 | 8/1991 | Schirmer | 428/516 |
| 5,047,253 | 9/1991 | Juhl | 426/113 |
| 5,089,073 | 2/1992 | Schirmer | 428/516 |
| 5,114,626 | 5/1992 | Huffman | 264/171 |
| 5,236,642 | 8/1993 | Blemberg et al. | 264/171 |

*Primary Examiner*—Mathieu Vargot

[57] ABSTRACT

A coextruded film with both gas barrier and fire retardant properties as well as good physical properties is made up by melt coextrusion to form a four or five layer film product useful in making laminates for protective clothing or tarps. The five layer film has a Saran resin barrier core layer and LDPE skin layers on each face with intervening EVA glue layers. The four layer film has a Saran resin barrier core layer and a CPE skin layer on one face and an EVA skin layer on the other with an EVA glue layer between the barrier core layer and the CPE skin layer. Each skin layer and each glue layer contains about 8 to about 30 percent by weight of a polyhalogenated organic/antimony oxide fire retardant and a small amount of a slip agent.

6 Claims, No Drawings

METHOD OF MAKING A MODIFIED BURN CHARACTERISTIC SARANEX FILM

CROSS-REFERENCE TO RELATED APPLICATION

This is a divisional of application Ser. No. 07/801,995 filed Dec. 3, 1991, now U.S. Pat. No. 5,250,350.

FIELD OF THE INVENTION

The invention relates to extruded films, particularly coextruded plural layer barrier films.

BACKGROUND OF THE INVENTION

Multilayer films have been made for a number of purposes. A heat-shrinkable multilayer film for primal meat packaging is described in U.S. Pat. No. 4,714,638. This film has a barrier layer of vinylidene chloride-methyl acrylate copolymer, and outer layers of ethylene-vinyl acetate copolymer.

A heat-shrinkable laminate film having gas-barrier properties as well as oil resistance properties is described in U.S. Pat. No. 4,547,433. These properties are provided by a film having as the core layer a copolymer of vinylidene chloride or a copolymer of ethylene and vinyl alcohol, and a first outer layer of a copolymer of ethylene and an alpha olefin or a blend of such copolymer with a major proportion of a copolymer of ethylene and vinyl acetate, with a second outer layer of similar composition that has been cross-linked using ionizing radiation, and adhesive layers used to bond the outer layers to the core layer.

Another barrier layer film is described in U.S. Pat. No. 4,778,715, the film having a layer of vinylidene chloride copolymer adhered to a layer comprising a blend of ethylene-butyl acrylate copolymer with linear ethylene-alpha olefin copolymer.

Additionally, U.S. Pat. No. 4,681,797 described a thermoformable, multi-layer plastic sheet with gas barrier properties made up of an inner gas barrier layer, such as vinylidene chloride-vinyl chloride copolymer faced on both sides with a glue layer and surrounded by polyolefin layers.

There is a need for a coextruded film that provides a gas barrier and is also resistant to burning, or is self-extinguishing, and is useful in making a protective laminate film. As may be seen, none of the foregoing provides such combination of properties.

U.S. Pat. No. 4,975,316, issued Dec. 4, 1990, discloses a fire retardant barrier structure in the form of a laminate structure, but does not claim the coextruded barrier film forming a part of the laminate, the barrier in the film being a Saran layer surrounded by outer layers of low density polyethylene.

SUMMARY OF THE INVENTION

It has now been discovered that there is obtained a coextruded film with good gas barrier properties and each of limiting oxygen index, drip/char and fire retardant behaviors adequate to pass standardized tests such as a small scale vertical burn test, substantially without exhibiting loss of physical strength properties, on coextruding (1) a barrier core layer of predominantly vinylidene chloride copolymer or polyvinylidene, blended with a minor proportion of ethylene/vinyl acetate copolymer (EVA), together with (2) a skin layer for each face thereof, at least one skin layer being a polyethylene layer containing in admixture, EVA, and as fire retardant additive at least about 8 weight percent of a polyhalogenated organic/antimony oxide composition, the other skin layer being the same or consisting primarily of EVA and said fire retardant additive and a little slip agent, and (3) adhering each skin layer containing predominantly polyethylene to the barrier core layer, utilizing an intervening glue or tie layer containing primarily EVA and at least about 8 weight percent of said fire retardant composition. The polyethylene skin layer or layers are selected from low density polyethylene (LDPE) or chlorinated polyethylene (CPE).

The addition of a minor amount of fumed silica to the polymer blends in the skin and glue layers may be used to modify and reduce drip/char characteristics where inherently too great for desired overall properties and there is need to tailor these characteristics.

In certain ranges of compositions the modified burn characteristic film of the invention finds special advantage when used in making a laminate structure for protective clothing that serves as a barrier to gases such as tritium as well as providing fire resistance. In other ranges and film thicknesses, the coextruded film finds special advantage when laminated and used as a tarp protective against promptly toxic chemical and/or biological agents as well as providing fire resistance.

The invention also contemplates a method of preparing the coextruded film described herein. A five-layer film is prepared by concurrently providing a stream of an LDPE skin composition in plastified form, a stream of EVA glue composition in plastified form, and a stream of Saran barrier core layer composition in plastified form, and dividing each of the stream of LDPE skin composition and EVA glue composition during coextrusion and combining the streams with the Saran composition, preparing a plural layer film with a Saran barrier core layer with an LDPE skin layer on each face thereof with an EVA glue layer interposed between each skin layer and the barrier core layer. A four-layer coextruded film is prepared by concurrently providing a stream of a CPE skin composition in plastified form, a stream of EVA glue composition in plastified form, and a stream of Saran barrier core layer composition in plastified form, and, dividing the stream of EVA glue layer composition and combining it with the other streams during coextrusion to provide a Saran barrier core layer with an EVA glue layer on each face thereof and a CPE skin layer covering only one of the glue layers.

DETAILED DESCRIPTION OF THE INVENTION

The present coextruded film with modified burn characteristics, as indicated, normally comprises a gas barrier core layer and a skin layer on both faces thereof, and a glue layer between the core layer and one or both skin layers if needed, each skin layer and glue layer containing a fire retardant composition, and, the individual layers and the thicknesses thereof being selected as herein described with a view to barrier, drip/char, limiting oxygen index, and strength properties needed for a useful protective coextruded film to use in making a laminate structure.

The barrier core, or vapor barrier, layer is an extruded film layer made up of a Saran resin, i.e., about 92 to about 98 percent by weight vinylidene chloride (VDC) copolymer with vinyl chloride, preferably about 94 to 96 percent of the vinylidene copolymer, and, the balance substantially an EVA copolymer.

The vinylidene chloride copolymer used will be made up by copolymerizing about 80 to 85 percent by weight of vinylidene chloride monomer and the balance vinyl chloride monomer, as well understood in the art of Saran films.

The ethylene/vinyl acetate copolymer, i.e., EVA, is made ups as understood in that arts by copolymerizing ethylene with vinyl acetate. See Encyclopedia of Chemical Technology, Kirk-Othmer, vol. 16.

A blend of the two copolymers in the weight ratio selected within the specified range of 92 to 98 percent by weight polyvinylidene or vinylidene copolymer and the balance substantially EVA is extruded at a temperature in the range of about 150 to about 180 degrees C. to obtain the barrier core layer used in the present coextruded film.

Wherein the skin layers used are primarily of a low density polyethylene (LDPE), the same will have a number average molecular weight in the range of about 9,500 to about 13,000, and a melt index of about 10.5 to about 13.5, preferably about 12. The LDPE layer is made up by extruding a blend of the LDPE selected with from about 3 to about 12 percent by weight of a slip agent, and about 8 to about 30 percent by weight, preferably about 10 to about 20 percent by weight, of a polyhalogenated organic compound/antimony oxide admixture in a low density polyethylene carrier that is effective in this concentration range without greatly adversely affecting strength properties of the coextruded film or increasing cost without corresponding benefit.

As used herein, the term slip agent is intended to embrace both slip agent and anti-blocking agent compositions containing finely divided silicon dioxide.

The EVA copolymers are commercially available. The copolymers useful in the present invention contain, in polymerized form, about 15 to 30 percent by weight of vinyl acetate and the balance substantially ethylene, and the copolymer has a number average molecular weight of about 15,000 to 25,000.

The preferred fire retardant composition is Ampacet 11371, a polybrominated organic compound blended with antimony oxide in a low density polyethylene carrier. Preferably, the amount of fire retardant composition is in the range of about 10 to about 20 percent by weight and most preferably the fire retardant composition is Ampacet 11371. The fire retardant composition selected must not degrade substantially during the coextrusion process of making the coextruded film, usually at a temperature in the range of about 170 to about 215 degrees C. On the other hand, to be effective, the fire retardant composition must degrade sufficiently to have a fire retardant effect at ignition temperatures of the other of about 330 degrees C.

Wherein the skin layer or layers are a polyethylene, LDPE, or chlorinated polyethylene (CPE), it is essential to use a glue or tie layer to achieve good bonding with the barrier core layer during coextrusion in order to obtain film with good integrity. Such a glue layer, when used to adhere LDPE to the barrier core layer, has as its composition a major amount of EVA in the range of about 75 to about 85 percent by weight, blended with a small amount of slip agent, e.g., about 1 to about 5 percent by weight, and with about 8 to about 30 percent by weight of fire retardant composition, preferably about 10 to about 20 percent, and preferably of the Ampacet 11371 composition.

At least one of the skin layers must be a polyethylene, i.e., LDPE or CPE, to obtain the strength properties and burn test characteristics desired. Ordinarily when one of the skin layers selected is LDPE the same will be used for the other skin which will also be made of LDPE. But when one of the skin layers is CPE or a blend of chlorinated polyethylenes, admixed with fire retardant composition, the other skin layer may be primarily of EVA. Again, the fire retardant composition is utilized at a concentration in the range of about 8 to about 30 percent by weight, preferably about 10 to about 20 percent by weight, and preferably of the Ampacet 11371 composition. Thus, the range of concentration of the fire retardant is the same for each skin and glue layer.

Wherein used in a skin layer, a chlorinated polyethylene (CPE) selected should have a melt index of about 0.5 to about 2, and preferably about 1, and provide desired strength properties to the coextruded film.

The glue layer used to adhere a CPE layer to the barrier core layer is also composed primarily of EVA with a small amount of slip or slip/anti-blocking agent, in addition to the fire retardant composition.

With one of the skin layers of CPE, the other skin layer may simply be a glue layer without a covering layer, the glue layer thus serving as a seal layer.

The composition of the polyethylene skin layers ranges broadly, in percent by weight, from about 70 to 80 percent LDPE or CPE, from about 2 to about 13 percent slip or slip/anti-blocking agent, and from about 8 to about 30 percent of fire retardant composition. Preferably, the proportions ranges from about 72 to about 78 percent of the LDPE or CPE, from about 3 to 12 percent of the slip or slip/anti-blocking agent, and from about 10 to 20 percent of the fire retardant composition.

The composition of the glue or tie layer, in percent by weight, ranges from about 70 to 90 percent EVA, from about 1 to about 6 percent of slip agent or slip/anti-blocking agent and from about 8 to about 30 percent of the fire retardant composition. Preferably, the proportions in the glue layer range from about 75 to about 85 percent EVA and more preferably about 80 percent, from about 1 to 5 percent slip agent or slip/anti-blocking agent, and from about 10 to 20 percent of the fire retardant composition.

In making up the polymer blends for extrusion, a slip agent or slip/anti-blocking agent of a conventional nature is usually added to improve the handling characteristics of the coextruded film. A typical slip agent contains finely divided silicon dioxide and a small amount of stearamide or erucylamide in an ethylene/vinyl acetate or LDPE carrier.

To obtain a coextruded film with desired barrier properties while also exhibiting the requisite fire retardancy and strength properties the film layer thicknesses must be selected and controlled during manufacture, i.e., during coextrusion of the selected layers into the coextruded film. The barrier core layer must be at least about 0.2 mil thick to exhibit significant vapor barrier properties. On the other hand, if the barrier core layer is more than about 0.5 mil thick, it has now been found that the coextruded film will exhibit insufficient tendency to drip away during burning, as shown in standardized small scale vertical burn tests. Dripping away is a means of preventing combustion from consuming the film to any great extent from the point of ignition if ignition occurs.

The coextruded film should have an overall thickness in the range of about 1½ to about 5 mils, preferably about 2 to 4 mils, in order to have the requisite protective qualities and also be flexible enough to be useful in protective clothing or a protective tarp. The volumetric relation between the respective layers in a four-layer film with only one CPE skin layer and one exposed EVA glue layer is approximately of the order 35:10:10:45 for the sequence EVA seal or glue layer:barrier core layer:glue layer:CPE skin layer; while the symmetrical five-layer film with two LDPE skin layers should have volumetric ratios of about 35:10:10:10:35 for skin layer:glue layer:barrier core layer:glue layer:skin layer.

Consequently, the LDPE and glue layers must be about 0.75 to about 1.5 mil thick and about 0.15 to about 0.65 mil thick, respectively. Wherein there is just one CPE skin layer, that skin layer should be about 1.25 to 2 mils thick.

In producing the coextruded film product of the invention, the requisite barrier core layer, skin layers and needed glue layer or layers are brought together and coextruded face to face, as well understood in the art. This kind of coextrusion of plural layers is described and exemplified in U.S. Pat. No. 3,557,265.

The resulting coextruded film has a ultimate tensile strength of the order of about 1800 to 3000 psi and an ultimate percent elongation of the order of about 400 to about 700 percent. The film has a limiting oxygen index of about 24 to about 28, indicating resistance to burning. The film also chars and drips, but does not burn, as determined in small scale vertical burn test ASTM D568, or to fit other specific requirements as indicated in other tests for specific uses when tailored therefor. For example, desired drip/shrink behavior can be tailored by selection of the melt index of the skin and glue layers while also adding a small amount of fumed silica, such as up to about 4 percent by weight, to reduce drip/shrink behavior.

More specifically, in carrying out the present method, an LDPE or CPE having the requisite melt index in the range specified is blended with a slip agent and fire retardant composition within the skin composition ranges specified herein, and is provided as a stream of plastified material at a temperature in the range of about 175 to about 220 degrees C., preferably about 175 degrees C.; while concurrently an EVA copolymer-slip agent-fire retardant blend within the glue layer composition ranges specified herein is provided as a stream of plastified material at a temperature in the range of about 160 to about 190 degrees C., preferably about 170 degrees C.; while, further, a barrier core Saran resin-EVA composition blend within the composition ranges specified herein is also concurrently provided as a stream of plastified material at a temperature in the range of about 150 to about 180 degrees C., preferably about 165 degrees C.; and then the LDPE combination, if employed, is coextruded into a five-layer coextruded film wherein the LDPE skin stream is divided, as is the glue layer into equal streams during coextrusion to form a barrier layer film from the five streams, with the barrier core layer having an LDPE skin layer on each face thereof with a glue layer interposed between each skin layer and the barrier core layer. When the CPE combination is employed in a separate operation, it may be coextruded into a four-layer coextruded film wherein the glue layer stream is divided and coextruded along with the CPE skin layer stream and the barrier core layer stream to form a barrier layer film with the barrier core layer having a glue layer on each face and only one of the glue layers covered by the single CPE skin layer, the glue layer not covered serving as a seal layer or skin.

Each of the layers are formed within the thickness ranges specified herein to provide barrier films useful in making laminate films for protective clothing or tarps.

The following examples are intended to be illustrative and not limiting upon the scope of the invention which must be considered defined by the scope of the appended claims.

EXAMPLE 1

A four-layer 4 mil coextruded film is produced by melt extrusion, consisting of a barrier core layer; with an EVA seal or skin layer on one face and a chlorinated polyethylene skin layer on the other; and with an EVA glue layer intermediate the CPE skin layer and the barrier core layer.

Listed as follows are the target thicknesses of each layer, and the composition of the respective layers, expressed in percent by weight:

| Barrier core layer: 0.38 mil–0.30 mil minimum | |
|---|---|
| Saran 469 resin | 95% |
| EVA copolymer | 5% |
| EVA skin layer: 1.25 mil–1.00 mil minimum | |
| EVA copolymer | 80% |
| slip/anti-blocking agent | 5% |
| Ampacet 11371 fire retardant | 15% |
| Glue layer: 0.50 mil–0.30 mil minimum | |
| EVA copolymer | 80% |
| slip/anti-blocking agent | 5% |
| Ampacet 11371 fire retardant | 15% |
| CPE skin layer: 1.87 mil–1.40 mil minimum | |
| CPE | 73% |
| slip agent | 12% |
| Ampacet 11371 fire retardant | 15% |

A. In a first run, the identified film layers are melt coextruded at temperatures of about 175 degrees C. for the skins, about 165 degrees C. for the barrier layer, and about 170 degrees C. for the glue layer, respectively.
B. In a second run, the coextrusion is repeated, but with 35 percent edge trim recycle of the feed for the skin layers.

The physical properties of the coextruded films made in the two runs are measured and tabulated as follows:

| | Physical Properties | |
|---|---|---|
| | Film of Run 1 | Film of Run 2 |
| COF | | |
| Skin/Skin | 0.17 | 0.13 |
| Glue/Glue | 0.17 | 0.15 |
| Heat Seal Adhesion- glue to glue | | |
| MD | 5.2 ± 0.2 lbs. | 5.2 ± 0.2 lbs. |
| TD | 5.1 ± 0.2 lbs. | 5.4 ± 0.2 lbs. |
| Ultimate Tensile Strength | | |
| MD | 2560 ± 120 psi | 2600 ± 110 psi |
| TD | 2030 ± 100 psi | 2260 ± 100 psi |
| Ultimate Elongation | | |
| MD | 550% | 550% |

-continued

| Physical Properties | | |
|---|---|---|
| | Film of Run 1 | Film of Run 2 |
| TD | 600% | 600% |

Heat seal conditions: 350 deg. F., 30 psi, 1 second dwell
COF = coefficient of friction. In a standardized test the force required to move a 200 gram weight over the film is recorded.
MD = film tested in machine direction of extrusion
TD = film tested in transverse direction On subjecting a sample of the four-layer film from each run in a small scale vertical test ASTM D568-77, in which the samples are free hanging during the test, the samples char, but tend not to burn and there is no sample drip and very little shrinkage away from the flame.

The samples both pass a limiting oxygen index (LOI) test with an index value in the range of 27–28, using the ASTM D2863-77 test procedure.

Upon repeating Runs 1 and 2, modified by utilizing for the EVA skin a composition containing about 3 percent by weight Cab-O-Sil EH-5 grade fumed silica having a surface area of 380 m$^2$/gram and a mean particle diameter of 0.007 micron, substituted for an equal weight of LDPE, the drip/shrink behavior of the samples is noticeably decreased.

Upon repeating the modified Runs 1 and 2, but using Cab-O-Sil M-5 grade fumed silica having a surface area of 200 m$^2$/gram and a mean particle diameter of 0.14 micron, instead of the EH-5 grade fumed silica, the drip/shrink behavior of the samples is decreased over the samples containing no fumed silica.

EXAMPLE 2

A five-layer 2 mil coextruded film is produced consisting of two LDPE skin layers; and a barrier core layer; in addition to EVA glue layers, one on each face of the barrier core layer interposed between that layer and the adjacent skin layer on each face.

Listed as follows are the target thicknesses of each layer, and the composition of the respective layers, expressed in percent by weight:

| Barrier core layer: 0.25 mil–0.20 mil minimum | |
|---|---|
| Saran 469 resin | 96% |
| EVA copolymer | 4% |
| Each EVA glue layer: 0.20 mil–0.15 mil minimum | |
| EVA copolymer | 78.8% |
| Ampacet 11371 fire retardant | 20% |
| slip agent | 1.2% |
| Each LDPE skin layer: balance to make 2 mil total (about 0.675 mil) | |
| LDPE 4012 | 76.6% |
| slip/anti-blocking agent | 3.4% |
| Ampacet 11371 fire retardant | 20% |

On subjecting a sample of the coextruded film to a small scale vertical burn test, FTMS-191-5903, in which the ignition source is applied for 12 seconds, the sample chars but does not burn, there is not sample drip and very little shrink away from the flame, and the sample passes the test.

The sample also shows, upon being tested, a satisfactory limiting oxygen index according to the ASTM D2863-77 test, and good physical strength and integrity properties for use as a protective tarp against chemical/biological agents.

The coextruded film of the invention may be made into a laminated film useful in protective clothing or protective tarps by joining overlaying films on one or both faces that improve abrasion resistance, and also modify the smoothness or color of the surface so that it is, e.g., printable, or, non-reflecting. Suitable examples of overlaying films that can be applied are composed of polyethylene or polyethylene scrim.

The layers to be made into laminated film may be brought together with an intermediate adhesive coating or layer that is passed over a hot roll before pressing the layers together between pressure rolls.

The layers may also be sealed together without the use of an intervening adhesive by heating the films to be joined to the softening point over a hot roll and then passing the films together between pressure rolls.

What is claimed is:

1. The method of making an extruded film with both gas barrier properties and modified burn characteristics comprising:

providing a polyethylene skin blend comprising in percent by weight from about 70 to about 80 percent of LDPE, from about 2 to about 13 percent of a slip agent, and from about 8 to about 30 percent of a fire retardant composition, as a stream of plastified material at a temperature of about 175 to about 220 degrees C.;

while concurrently providing an EVA copolymer glue layer blend comprising in percent by weight from about 70 to about 90 percent of EVA copolymer, from about 1 to about 6 percent of slip agent, and from about 8 to about 30 percent of the fire retardant composition, as a stream of plastified material at a temperature of about 160 to about 190 degrees C.;

while also concurrently providing a barrier core blend comprising in percent by weight about 92 to about 98 percent of VDC copolymer with vinyl chloride and the balance substantially EVA copolymer, as a stream of plastified material at a temperature of about 150 to about 180 degrees C.; and dividing the stream of polyethylene skin blend and the stream of glue layer blend and coextruding the divided streams plus the barrier core blend to form a substantially symmetrical five-layer coextruded film with the barrier core layer having a polyethylene skin layer on each face and interposed between each of the skin layers and the barrier core layer a glue layer, and the fire retardant composition being a polyhalogenated organic compound/antimony oxide blend in a low density polyethylene carrier.

2. The method of making a coextruded film with both gas barrier properties and modified burn characteristics comprising:

providing a polyethylene skin blend comprising in percent by weight from about 70 to about 80 percent of CPE, from about 2 to about 13 percent of a slip agent, and from about 8 to about 30 percent of a fire retardant composition, as a stream of a plastified material at a temperature of about 175 to about 220 degrees C.;

while concurrently providing an EVA copolymer glue layer blend comprising in percent by weight from about 70 to about 90 percent EVA copolymer, from about 1 to about 6 percent slip agent, and from about 8 to about 30 percent of the fire retardant composition as a stream of plastified material at a temperature of about ]60 to about 190 degrees C.;

while also concurrently providing a barrier core blend comprising in percent by weight about 92 to about 98 percent of VDC copolymer with vinyl chloride and the balance substantially EVA copolymer, as a stream of plastified material at a temperature of about 150 to about 180 degrees C.; and dividing the stream of the glue layer blend into two streams and coextruding the divided streams along the stream of polyethylene skin blend and the stream of barrier core blend to form a four-layer coextruded film with a barrier core layer having on each face thereof a glue layer, and a polyethylene skin layer over one of the glue layers, the glue layer not covered serving as a seal layer, and the fire retardant composition being a polyhalogenated organic compound/antimony oxide blend in a low density polyethylene carrier.

3. The method of claim 2 wherein up to about 3 percent by weight of fumed silica is employed in replacement for an equal weight of CPE in the polyethylene skin blend provided.

4. The method of claim 2 wherein the respective layers are extruded to respective thicknesses to provide an approximate sequential volumetric relation, in percent, within the final extruded four layer film, of 35:10:10:45.

5. The method of claim 1 wherein up to about 3 percent by weight of fumed silica is employed in replacement for an equal weight of LDPE in the polyethylene skin blend provided.

6. The method of claim 1 wherein the respective layers are extruded to respective thicknesses to provide an approximate sequential volumetric relation, in percent, within the final coextruded five layer film, of 35:10:10:10:35.

* * * * *

UNITED STATES PATENT AND TRADEMARK OFFICE
CERTIFICATE OF CORRECTION

PATENT NO. : 5,356,583
DATED : October 18, 1994
INVENTOR(S) : Harvey C. Tung

It is certified that error appears in the above-indentified patent and that said Letters Patent is hereby corrected as shown below:

Column 8, Line 15, in Claim 1, "extruded" should correctly appear as --coextruded--.

Column 8, Line 67, in Claim 2, "160" should correctly appear as --160--.

Column 10, Line 8, in Claim 4, "extruded" should correctly appear as --coextruded--.

Signed and Sealed this

First Day of August, 1995

Attest:

BRUCE LEHMAN

*Attesting Officer*     *Commissioner of Patents and Trademarks*